United States Patent
Fukushima et al.

(10) Patent No.: US 11,850,839 B2
(45) Date of Patent: Dec. 26, 2023

(54) FIXING STRUCTURE OF WIRING MEMBER

(71) Applicants: Sumitomo Wiring Systems, Ltd., Mie (JP); SUMITOMO ELECTRIC INDUSTRIES, LTD., Osaka (JP); AutoNetworks Technologies, Ltd., Mie (JP)

(72) Inventors: Daichi Fukushima, Mie (JP); Hiroki Hirai, Mie (JP); Makoto Higashikozono, Mie (JP); Housei Mizuno, Mie (JP); Miyu Aramaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD, Osaka (JP)

( * ) Notice: Subject to any disclaimer, the term of this patent is extended or adjusted under 35 U.S.C. 154(b) by 515 days.

(21) Appl. No.: 17/265,340

(22) PCT Filed: Jul. 18, 2019

(86) PCT No.: PCT/JP2019/028284
§ 371 (c)(1),
(2) Date: Feb. 2, 2021

(87) PCT Pub. No.: WO2020/031650
PCT Pub. Date: Feb. 13, 2020

(65) Prior Publication Data
US 2021/0316530 A1    Oct. 14, 2021

(30) Foreign Application Priority Data
Aug. 8, 2018    (JP) .................. 2018-148977

(51) Int. Cl.
*B32B 7/12*    (2006.01)
*C09J 7/35*    (2018.01)
(Continued)

(52) U.S. Cl.
CPC .................. *B32B 7/12* (2013.01); *B32B 3/14* (2013.01); *C09J 7/35* (2018.01); *H01B 7/40* (2013.01);
(Continued)

(58) Field of Classification Search
CPC .. B32B 7/12; B32B 2307/202; B32B 2405/00
See application file for complete search history.

(56) References Cited

U.S. PATENT DOCUMENTS

2005/0252677 A1* 11/2005 Gagne .................. H01B 7/0869
174/117 F
2010/0108141 A1* 5/2010 Fukushima ........... H01L 31/186
174/126.1
(Continued)

FOREIGN PATENT DOCUMENTS

| CN | 102207302 | 10/2011 |
| CN | 202839816 U | 3/2013 |

(Continued)

OTHER PUBLICATIONS

China Office Action, issued in China Patent Application No. 201980051748.5, dated Feb. 14, 2022, together with an English translation thereof.
(Continued)

*Primary Examiner* — Sherman Ng
(74) *Attorney, Agent, or Firm* — GREENBLUM & BERNSTEIN, P.L.C.

(57) ABSTRACT

A fixing structure of a wiring member includes an adhesive member, a wire-like transmission member, and an adherent. The adhesive member includes a planar base body having
(Continued)

conductivity, a first hot-melt adhesive agent provided on one main surface of the base body, and a second hot-melt adhesive agent provided on another main surface of the base body. The base body can generate heat by induction heating using an induction heating apparatus. The wire-like transmission member is bonded to the first hot-melt adhesive agent in the adhesive member on a side of the one main surface of the base body. The adherent is bonded to the second hot-melt adhesive agent in the adhesive member on a side of the another main surface of the base body.

4 Claims, 2 Drawing Sheets

(51) Int. Cl.
  B32B 3/14 (2006.01)
  H01B 7/40 (2006.01)
(52) U.S. Cl.
  CPC ..... *B32B 2307/202* (2013.01); *B32B 2405/00* (2013.01); *C09J 2203/326* (2013.01); *C09J 2301/1242* (2020.08)

(56) References Cited

U.S. PATENT DOCUMENTS

| | | | |
|---|---|---|---|
| 2013/0098674 A1 | 4/2013 | Shoemaker et al. | |
| 2018/0082765 A1 | 3/2018 | Endo et al. | |
| 2018/0232080 A1* | 8/2018 | Iwami | H05K 9/0096 |

FOREIGN PATENT DOCUMENTS

| | | |
|---|---|---|
| CN | 105236829 | 1/2016 |
| CN | 107430907 | 12/2017 |
| CN | 209472332 U | 10/2019 |
| JP | 2002-112440 | 4/2002 |
| JP | 2002-371253 | 12/2002 |
| JP | 2005-179420 | 7/2005 |
| JP | 2011-124178 | 6/2011 |
| JP | 2013-535182 | 9/2013 |
| WO | 2013/111610 | 8/2013 |

OTHER PUBLICATIONS

China Office Action, issued in China Patent Application No. 201980051748.5, dated Nov. 17, 2021, together with an English translation thereof.
Japan Office Action issued in Japan Patent Application No. 2020-536418, dated Nov. 2, 2021, together with English translation thereof.
International Search Report issued in International Patent Application No. PCT/JP2019/028284, dated Oct. 15, 2019.
Written Opinion issued in International Patent Application No. PCT/JP2019/028284, dated Oct. 15, 2019.
International Preliminary Report on Patentability issued in International Patent Application No. PCT/JP2019/028284, dated Feb. 12, 2020.

* cited by examiner

FIXING STRUCTURE OF WIRING MEMBER

TECHNICAL FIELD

The present disclosure relates to a fixing structure of a wiring member.

BACKGROUND ART

Patent Document 1 discloses a technique of bonding an electrical wire to an adherend via a hot-melt adhesive agent provided on both surfaces of a base body.

PRIOR ART DOCUMENTS

Patent Documents

Patent Document 1: Japanese Patent Application Laid-Open No. 2002-112440

SUMMARY

Problem to be Solved by the Invention

However, in Patent Document 1, a base body is a resin sheet, thus a hot-melt adhesive agent needs to be melted by externally heating it by a thermal press, for example, thus when the hot-melt adhesive agent needs to be heated in a state where the electrical wire has contact with the hot-melt adhesive agent, there is a possibility that tin amount of heat of the electrical wire also increases.

Therefore, it is an object to provide a technique capable of suppressing an amount of heat for bonding even when a hot-melt adhesive agent is heated in a state where a wire-like transmission member has contact with the hot-melt adhesive agent.

Means to Solve the Problem

A fixing structure of a wiring member according to the present disclosure is a fixing structure of a wiring member including: an adhesive member including a planar base body having conductivity, a first hot-melt adhesive agent provided on one main surface of the base body, and a second hot-melt adhesive agent provided on another main surface of the base body; at least one wire-like transmission member bonded to the first hot-melt adhesive agent in the adhesive member on a side of the one main surface of the base body; and an adherend bonded to the second hot-melt adhesive agent in the adhesive member on a side of the another main surface of the base body.

Effects of the Invention

According to the present disclosure, an amount of heat for bonding can be suppressed even when a hot-melt adhesive agent is heated in a stale where a wire-like transmission member has contact with the hot-melt adhesive agent.

DESCRIPTION OF EMBODIMENT(S)

[Description of Embodiment of Present Disclosure]

Figure 1:
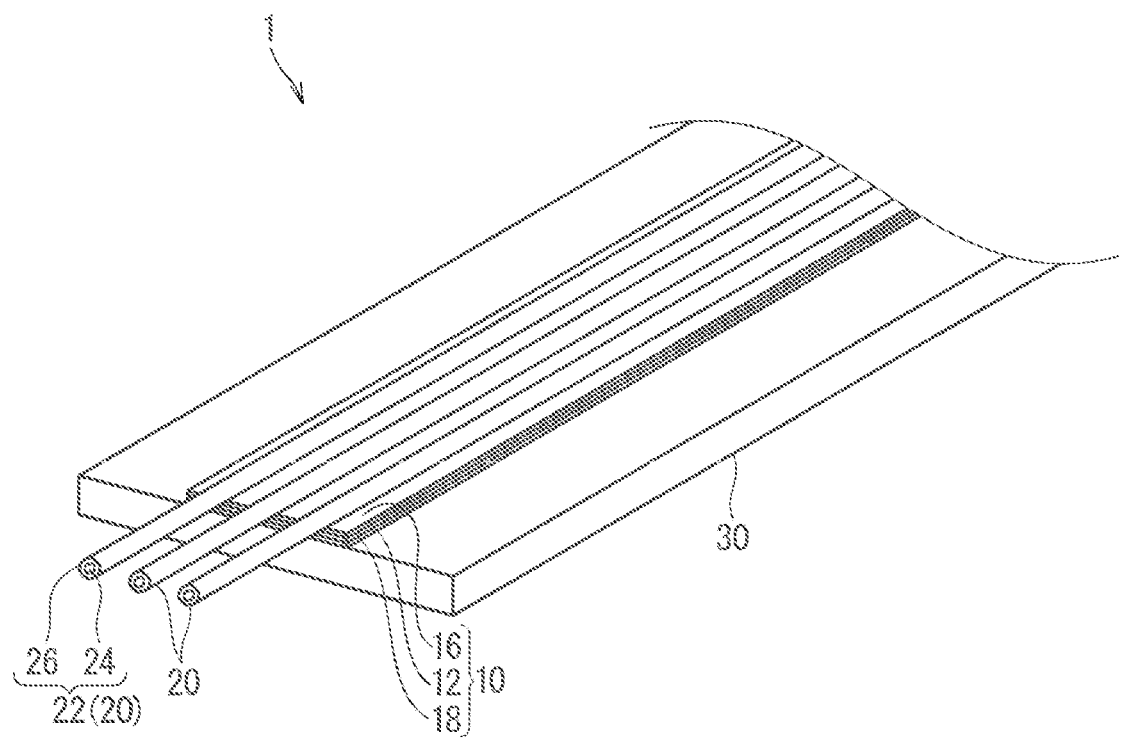
FIG. 1 is a perspective view illustrating a fixing structure of a wiring member according to an embodiment.

Embodiments of the present disclosure are listed and described firstly.

A fixing structure of a wiring member according to tire present disclosure is as follows.

(1) A fixing structure of a wiring member according to the present disclosure is a fixing structure of a wiring member including: an adhesive member including a planar base body having conductivity, a first hot-melt adhesive agent provided on one main surface of the base body, and a second hot-melt adhesive agent provided on another main surface of the base body; at least one wire-like transmission member bonded to the first hot-melt adhesive agent in the adhesive member on a side of the one main surface of the base body; and an adherend bonded to the second hot-melt adhesive agent in the adhesive member on a side of the another main surface of the base body. The base body can be selectively heated by high-frequency induction heating. At this time, the first and second hot-melt adhesive agents are heated by heat transmitted from the base body. Thus, an amount of heat for bonding can be suppressed even when the hot-melt adhesive agent is heated in a slate where the wire-like transmission member has contact with the hot-melt adhesive agent.

(2) The wire-like transmission member may be an electrical wire including a wire-like core wire made of metal and an insulating covering for covering the core wire. The wire-like core wire is hardly heated by high-frequency induction heating compared with the planar base body. Thus, even when the wire-like transmission member is the electrical wire, increase in an amount of heat to the insulating covering due to a thermal conduction from the core wire can be suppressed.

(3) The first hot-melt adhesive agent may be bonded to the wire-like transmission member more easily than the second hot-melt adhesive agent. Accordingly, a fixing strength between the adhesive member and the wire-like transmission member can be increased.

(4) The first hot-melt adhesive agent and the covering of the wire-like transmission member may be formed of the same kind of resin. Accordingly, a compatible combination can be easily set between the first hot-melt adhesive agent and the covering of the wire-like transmission member.

(5) The second hot-melt adhesive agent may be bonded to the adherent more easily than the first hot-melt adhesive agent. Accordingly, a fixing strength between the adhesive member and the adherent can be increased.

(6) The second hot-melt adhesive agent and the adherent may be formed of the same kind of resin. Accordingly, a compatible combination can be easily set between the second hot-melt adhesive agent and the adherent.

(7) It is also applicable that the plurality of wire-like transmission members are bonded to the first hot-melt adhesive agent, and when high-frequency induction heating is performed, the second hot-melt adhesive agent, and the adherent are bonded to each other in a bonding state of being dissolved more easily than a bonding slate of the first hot-melt adhesive agent and the wire-like transmission member. Accordingly, the plurality of wire-like transmission members can be collectively detached together with the whole base body from the adherent at a time of scrapping or repairing a vehicle, for example.

[Details of Embodiment of Present Disclosure]

Specific examples of a fixing structure of a wiring member of the present disclosure are described hereinafter with reference to the drawings. The present invention is not limited to these examples, but is indicated by claims, and it is intended that meanings equivalent to claims and all modifications within a scope of claims are included.

Embodiment

Figure 2:
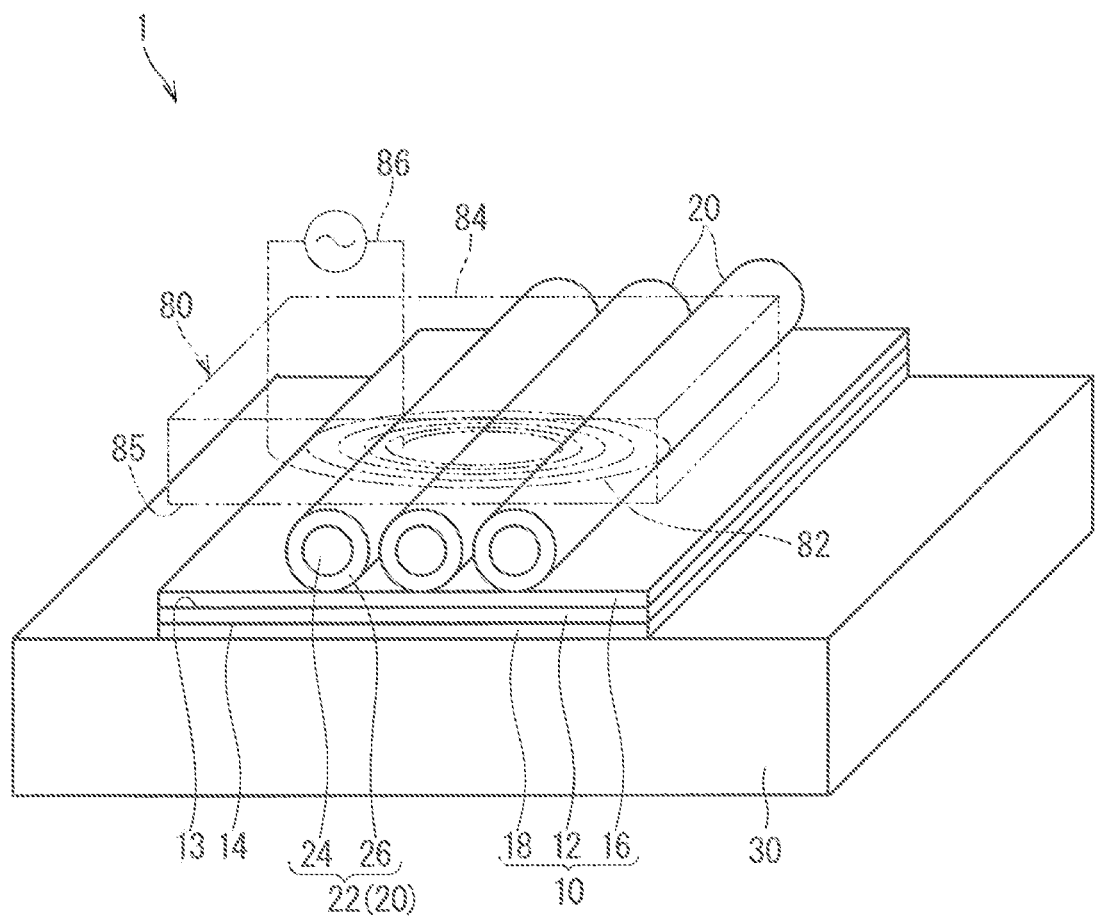
FIG. 2 is an explanation drawing illustrating a manufacture of the fixing structure of the wiring member according to the embodiment.

A fixing structure of a wiring member according to an embodiment is described hereinafter. FIG. 1 is a perspective view illustrating a fixing structure 1 of a wiring member according to the embodiment. FIG. 2 is an explanation drawing illustrating a manufacture of the fixing structure 1 of the wiring member according to the embodiment.

The fixing structure 1 of the wiring member includes an adhesive member 10, a wire-like transmission member 20, an adherent 30. In the fixing structure 1 of the wiring member, the wire-like transmission member 20 and the adherent 30 are bonded and fixed by the adhesive member 10.

The adhesive member 10 includes a base body 12, a first hot-melt adhesive agent 16, and a second hot-melt adhesive agent 18.

The base body 12 becomes a heat generating body by induction heating. A material of the base body 12 is not particularly limited as long as it has conductivity and can generate heat by induction heating, thus conductive resin can also be adopted as with metal such as iron, nichrome, aluminum, and copper, for example. It is preferable that the base body 12 is made up of a material having high heat generating efficiency by induction heating such as a material having conductivity and high magnetic permeability, for example. Particularly, when a metal material is used for the wire-like transmission member 20, the base body 12 is preferably made up of a material having heat generating efficiency equal to or higher than the metal material of the wire-like transmission member 20. For example, when aluminum or copper, for example, is used for the wire-like transmission member 20, a material of the base body 12 is preferably iron, nichrome, aluminum, or copper, for example.

The base body 12 is planarly formed. For example, a conductive foil can be used as the base body 12. A width dimension, a length dimension, and a thickness dimension of the base body 12 can be appropriately set. For example, it is sufficient that the width dimension of the base body 12 is large enough to mount the wire-like transmission member 20, and is set in accordance with the number of the wire-like transmission members 20 and an interval between the wire-like transmission members 20. For example, it is sufficient that the length dimension of the base body 12 is a dimension in accordance with a length dimension of the wire-like transmission member 20. At this time, an end portion of the wire-like transmission member 20 may be set to extend to an outer side of the base body 12, or may also be set to be located on the base body 12. For example, it is sufficient that the thickness dimension of the base body 12 is set in accordance with a routing of the adhesive member 10, an amount of heat generation, and a frequency of an alternating current. For example, if the base body 12 is thin, there is a possibility that the base body 12 is broken at the time of routing the adhesive member 10. In contrast, if the base body 12 is thick, there is a possibility that resistance decreases and current hardly flows inside the base body 12, thus an amount of heat generation decreases. If the base body 12 is thick, there is a possibility that the adhesive member 10 is hardened. In consideration of these conditions, the thickness dimension of the base body 12 is considered to range from 1 micrometer to 3 millimeters, for example.

The first hot-melt adhesive agent 16 is provided on one main surface 13 of the base body 12. The first hot-melt adhesive agent 16 may be provided on only a part of the one main surface 13 of the base body 12, but is preferably provided on a whole surface of the one main surface 13 of the base body 12. The first hot-melt adhesive agent 16 is provided on the whole surfaced the one main surface 13 of the base body 12, thus a direct heat radiation from the one main surface 13 of the base body 12 to the air is suppressed, thus more efficient heating of the first hot-melt adhesive agent 16 can be achieved.

The second hot-melt adhesive agent 18 is provided on the other main surface 14 of the base body 12. The second hot-melt adhesive agent 18 may be provided on only a part of the other main surface 14 of the base body 12, but is preferably provided on a whole surface of the other main surface 14 of the base body 12. The second hot-melt adhesive agent 18 is provided on the whole surface of the other main surface 14 of the base body 12, thus a direct heat radiation from the other main surface 14 of the base body 12 to the air is suppressed, thus more efficient heating of the second hot-melt adhesive agent 18 can be achieved.

Thicknesses of the first and second hot-melt adhesive agents 16 and 18 are not particularly limited, but may be appropriately set in accordance with adhesive force between the first and second hot-melt adhesive agents 16 and 18 and the wire-like transmission member 20 and the adherent 30, which are the other sides of adhesion, and operation efficiency, for example. For example, if the hot-melt adhesive agent is thin, there is a possibility that sufficient adhesive force cannot be obtained between the base body 12 and the other side of adhesion. For example, if the hot-melt adhesive agent is thick, there is a possibility that it takes time to soften the hot-melt adhesive agent after heating, and it takes time to manufacture the wiring member. In consideration of these conditions, the thicknesses of the first and second hot-melt adhesive agents 16 and 18 are considered to range from 50 micrometers to 200 micrometers. The thicknesses of the first and second hot-melt adhesive agents 16 and 18 may be the same, or it is also applicable that the first hot-melt adhesive agent 16 is thicker or the second hot-melt adhesive agent 18 is thicker.

Materials of the first and second hot-melt adhesive agents 16 and 18 are not particularly limited as long as they can be used as a hot-melt adhesive agent. A polyolefin series hot-melt adhesive agent, a polyester series hot-melt adhesive agent, a polyamide series hot-melt adhesive agent, and a synthetic rubber hot-melt adhesive agent, for example, can be used as the first and second hot-melt adhesive agents 16 and 18.

The adhesive member 10 can be formed by fusion bonding the first and second hot-melt adhesive agents 16 and 18 molded into a sheet-like shape to the base body 12 also molded into a sheet-like shape by lamination processing, for example. For example, the adhesive member 10 can also be formed by applying a solvent containing materials, which are to be the first and second hot-melt adhesive agents 16 and 18, to the sheet-like base body 12 and drying it.

The adhesive member 10 may be cut into a predetermined size from a parent material formed to have a large size and used.

The wire-like transmission member 20 is bonded to the first hot-melt adhesive agent 16 in the adhesive member 10 on n side of the one main surface 13 of the base body 12. One or a plurality of (three in the example illustrated in FIG. 1) wire-like transmission members 20 are bonded to the first hot-melt adhesive agent 16.

The wire-like transmission member 20 is a member joined to a component mounted to a vehicle to transmit electrical power and/or light to and/or from the component. It is sufficient that the wire-like transmission member 20 is a wire-like member transmitting electrical power or light. For example, the wire-like transmission member 20 may be a general wire having a core w ire and a covering around the core wire, or may also be a bare conductive wire, a shielded wire, an enamel wire, a nichrome wire, or an optical fiber.

The wire-like transmission member 20 transmitting the electrical power may be various kinds of signal lines or various kinds of power lines. The wire-like transmission member 20 transmitting the electrical power may be used as an antenna or coil, for example, transmitting or receiving a signal or electrical power to or from a space.

In the description herein, the wire-like transmission member 20 is an electrical wire 22 including a wire-like core wire 24 made of metal and an insulating covering 26 for covering the core wire 24.

The core wire 24 includes one or a plurality of strands. Each strand is formed of a conductive material such as copper, copper alloy, aluminum, and aluminum alloy, for example. When the core wire 24 is made up of the plurality of strands, the plurality of strands are preferably stranded. A diameter of the core wire 24 is appropriately set in accordance with a purpose of use of the electrical wire 22, for example. At this time, the diameter of the core wire 24 may be the same as the thickness of the base body 12, or may also be smaller or larger than the thickness of the base body 12.

The insulating covering 26 is formed of a resin material extrusion-molded around the core wire 24. The resin material constituting the insulating covering 26 is not particularly limited as long as it is used as a covering material of a vehicle electrical wire, however, polyvinyl chloride (PVC) or polyethylene (PE) can be used, for example.

In the example illustrated in FIG. 1, the wire-like transmission member 20 is disposed straight, however, a route of the wire-like transmission member 20 may be appropriately set, thus may also be bended and disposed on the adhesive member 10 or the adherent 30. In the example illustrated in FIG. 1, the plurality of wire-like transmission members 20 are disposed to extend in parallel to each other, however, routes of the plurality of wire like transmission members 20 may be appropriately set, thus may also be branched on the adhesive member 10 or the adherent 30 or disposed to intersect with each other along different routes. In the example illustrated in FIG. 1, the plurality of the same wire-like transmission members 20 are disposed on one adhesive member 10, however, a diameter, a purpose of use, and a structure of each of the plurality of wire-like transmission members 20 may be appropriately set, thus the wire-like transmission members 20 each having a different diameter, a purpose of use, and a structure, for example, may be bonded to the same adhesive member 10.

The adherent 30 is bonded to the second hot-melt adhesive agent 18 in the adhesive member 10 on a side of the other main surface 14 of the base body 12.

In the description, a portion of the adherent 30 where the adhesive member 10 is bonded is made of resin. Adoptable as the adherent 30 is a member having various types of resin parts mounted to an automobile such as an interior member (design member) such as a trim, a molded roof, an installment panel, and a floor carpet, a sound insulation member such as a silencer, or each component of a resin vehicle body, for example.

It is sufficient that a surface of the adherent 30 to which the adhesive member 10 is bonded is equal or larger than the adhesive member 10 in size. It is sufficient that the adhesive member 10 is formed to be equal to or smaller than a surface of the adherent 30 to which the adhesive member 10 is bonded.

In the example illustrated in FIG. 1, a shape of a portion of the adherent 30 where the adhesive member 10 is bonded is a flat shape, however, this configuration is not necessary. For example, the shape of the portion of the adherent 30 where the adhesive member 10 is bonded may be a shape with a level difference or unevenness or a bended shape. When the portion of the adherent 30 to which the adhesive member 10 is bonded has the bended shape, the portion of the adhesive member 10 extending in the width direction (the width direction of the wire-like transmission member 20, a direction in which the plurality of wire-like transmission members 20 are arranged) may be bonded to be bended along the adherent 30, or the portion of the adhesive member 10 extending in the longitudinal direction (the longitudinal direction of the wire-like transmission member 20) may be bonded to be bended along the adherent 30.

A resin material constituting the portion of the adherent 30 to which the adhesive member 10 is bonded is not particularly limited, but can be appropriately selected from a resin material used for a vehicle, such as polyolefin, polyester, polyamide, polyurethane, polyvinyl chloride, various types of elastomer, and fiber-reinforced plastic, for example.

The portion of the adherent 30 to which the adhesive member 10 is bonded may be a fiber material such as a knitted fabric, a woven fabric, and a non-woven fabric, for example, or a non-fiber material is also applicable. A foam molding material or a filled material which is not a foam molding material but has a uniform-filled cross section may also be applied as the non-woven material.

Herein, the insulating covering 26 of the wire-like transmission member 20 and the portion of the adherent 30 to which the adhesive member 10 is bonded are formed of different resin materials. At this time, different hot-melt adhesive agents are adopted as the first and second hot-melt adhesive agents 16 and 18 herein. The first hot-melt adhesive agent 16 is bonded to the wire-like transmission member 20 more easily than the second hot-melt adhesive agent 18. The second hot-melt adhesive agent 18 is bonded to the adherent 30 more easily than the first hot-melt adhesive agent 16.

Herein, a case where one of the two hot-melt adhesive agents is bonded to the other side of adhesion more easily than the other one of them indicates that when the two hot-melt adhesive agents with similar thickness dimensions are thermally bonded to the other side of adhesion with temperatures appropriate for each a heating temperature, an adhesion strength of one of them is higher than that of the other one of them.

Herein, the first hot-melt adhesive agent 16 and the insulating covering 26 of the wire-like transmission member 20 are formed of the same kind of resin, thus the first hot-melt adhesive agent 16 is bonded to the wire-like transmission member 20 more easily than the second hot-melt adhesive agent 18. Similarly, the second hot-melt adhesive agent 18 and the adherent 30 are formed of the same kind of resin, thus the second hot-melt adhesive agent 18 is bonded to the adherent 30 more easily than the first hot-melt adhesive agent 16.

Moreover, it is known that there is compatibility in the hot-melt adhesive agent depending on a material. Accordingly, even when the hot-melt adhesive agent and the other side of adhesion are formed of resin of a different system, it is also considered that the first hot-melt adhesive agent 16 is bonded to the wire-like transmission member 20 more easily than the second hot-melt adhesive agent 18, or the second hot-melt adhesive agent 18 is bonded to the adherent 30 more easily than the first hot-melt adhesive agent 16 due to the compatibility.

When high-frequency induction heating is performed in a state where the fixing structure 1 of the wiring member is formed, the second hot-melt adhesive agent 18 and the adherent 30 are bonded to each other in a bonding state of being dissolved more easily than a bonding state of the first hot-melt adhesive agent 16 and the wire-like transmission member 20.

The above configuration is achieved when a softening temperature of the first hot-melt adhesive agent 16 is higher than a softening temperature of the second hot-melt adhesive agent 18. In this case, the adhesive member is heated to a temperature lower than the softening temperature of the first hot-melt adhesive agent 16 and higher than the softening temperature of the second hot-melt adhesive agent 18, thus the bonding state of the second hot-melt adhesive agent 18 and the adherent 30 is dissolved more easily than the bonding stale of the first hot-melt adhesive agent 16 and the wire-like transmission member 20.

The above configuration is achieved when an adhesion strength between the first hot-melt adhesive agent 16 and the wire-like transmission member 20 is higher than an adhesion strength between the second hot-melt adhesive agent 18 and the adherent 30 in a normal state. In this case, the configuration that the softening temperature of the first hot-melt adhesive agent 16 is higher than the softening temperature of the second hot-melt adhesive agent 18 is not necessary, however, it is preferable that the former temperature is equal to or larger than the latter temperature. The adhesion strength can be appropriately set by changing thicknesses of the first and second hot-melt adhesive agents 16 and 18 or changing types of the first and second hot-melt adhesive agents 16 and 18 in view of the compatibility of the wire-like transmission member 20 and the adherent 30.

<Manufacturing Method>

The adhesive member 10 can be heated by an induction healing apparatus 80. An example of the induction heating apparatus 80 is described firstly.

The induction heating apparatus 80 includes a coil 82, a body part 84 housing the coil 82, and a generation mechanism 86 of generating alternating current for flowing the alternating current to the coil 82. A proximity surface 85 getting close to the other side member is provided on the body part 84. When the alternating current flows in the coil 82 in the induction heating apparatus 80, a magnetic line is generated around the coil 82. The proximity surface 85 is a surface through which a lot of magnetic line pass. The generation mechanism 86 of generating the alternating current is not particularly limited, but may be made up in accordance with a power source. For example, the induction heating apparatus 80 uses a commercial power source, the generation mechanism 86 is considered to be made up of an electrical transformer reducing voltage of the commercial power source, a rectifier rectifying alternating current to direct current, and a high-frequency generator generating a high frequency from the direct current, for example. The frequency of the alternating current is appropriately set depending on a type of metal constituting the base body 20. When the induction heating apparatus 80 uses a battery power supply, the electrical transformer and the rectifier can be omitted.

In heating the adhesive member 10, the proximity surface 85 of the induction heating apparatus 80 is brought close to the adhesive member 10 and the alternating current is flowered in the coil 82. In the example illustrated in FIG. 2, the proximity surface 85 of the induction healing apparatus 80 is brought close to the base body 12 from a side of one main surface 13 (a side of the wire-like transmission member 20), however, it is also applicable that the proximity surface 85 is brought close to the base body 12 from a side of the other main surface 14 (a side of the adherent 30) or from both sides. In the example illustrated in FIG. 2, the induction heating is performed in a state where both the wire-like transmission member 20 and the adherent 30 are in contact with the adhesive member 10. At this time, the proximity surface 85 is pressed against the wire-like transmission member 20, but needs not be pressed. The same applies to a case where the proximity surface 85 of the induction heating apparatus 80 is brought close to the base body 12 from the side of the other main surface 14 (the side of the adherent 30).

The alternating current flows in the coil 82, and the magnetic line generated around the coil 82 passes through the base body 12 of the adhesive member 10. At this time, eddy current flows in the base body 12, thus Joule heat is generated in the base body 12 in accordance with an eddy-current less. Accordingly, the base body 12 generates heat, thus the first and second hot-melt adhesive agents 16 and 18 having contact with the base body 12 are heated and softened. Then, layers of the softened first and second hot-melt adhesive agent 16 and 18 adhere to the wire-like transmission member 20 and the adherent 30, respectively. Subsequently, the electrical power is turned off or the induction heating apparatus 80 is separated to finish the induction heating and the first and second hot-melt adhesive agents 16 and 18 are cooled by natural cooling and forced cooling, for example, thus the first and second hot-melt adhesive agent 16 and 18 enter a state of being bonded to the wire-like transmission member 20 and the adherent 30.

Herein, with regard to the heat generation by the eddy-current loss, when magnetic permeability of the material increases, magnetic flux can be increased and a heat generation efficiency is increased. When electrical resistance of the material increases. Joule heat increases and the heat generation efficiency is increased. Thus, iron has higher heal generation efficiency than copper and aluminum. In copper and aluminum, when a frequency of alternating current is increased, a depth of penetration based on a skin effect decreases, thus a sufficient heat generation amount can be obtained.

When the base body 12 is formed of a material having a high magnetic permeability, a heat generation by hysteresis loss also increases. Thus, when the base body 12 is formed of iron which is a material having the high magnetic permeability than copper and aluminum, the heat generation efficiency can be increased.

Herein, the wire-like transmission member 20 is the electrical wire 22 and the core wire 24 thereof is made up of a conductor as a material. However, the wire-like core wire 24 has a smaller area where magnetic line passes through titan the base body 12, thus eddy current is hardly generated and the heat generation efficiency is low compared with the base body 12. Thus, even in a case where the induction heating is performed by the induction heating apparatus 80 in a state where the adhesive member 10 and the wire-like transmission member 20 have contact with each other, the heat generation of the core wire 24 can be suppressed, and a melting of the insulating covering 26 can be thereby suppressed. Particularly, even when the proximity surface 85 is pressed against an outer surface of the insulating covering 26 on an opposite side of the core wire 24 from the adhesive member 10, a trouble that the outer surface is melted and a thickness of the insulating covering 26 decreases hardly occurs.

A principle that the eddy-current loss in the wire-like transmission member 20 is smaller than that in the planar base body 12 is considered to be similar to a principle that in a case where an iron core is provided in a coil in an electrical transformer, when the iron core is made up of a laminated iron plates, eddy current generated in the iron core gets small. At this time, the planar base body 12 having the larger area than the wire-like transmission member 20 is used herein to positively generate the eddy-current loss in the base body 12, and used is a function effect opposite to a function effect that the iron core is made up of the laminated iron plates to be able to reduce eddy current generated in the iron core.

<Motion>

Considered next is a case where high-frequency induction heating is performed in a state where the fixing structure 1 of the wiring member is formed. For example, assumed is a case when the plurality of wire-like transmission members 20 need to be detached from the adherent 30 at a time of scrapping or repairing a vehicle, they are detached using the high-frequency induction heating.

As described above, when the high-frequency induction heating is performed in the state where the fixing structure 1 of the wiring member is formed, the second hot-melt adhesive agent 18 and the adherent 30 are bonded to each other in the bonding state of being dissolved more easily than the bonding state of the first hot-melt adhesive agent 16 and the wire-like transmission member 20. Accordingly, when the high-frequency induction heating is performed in the state where the fixing structure 1 of the wiring member is formed, the adherent 30 can be pulled out from the base body 12 of the adhesive member 10, and the plurality of wire-like transmission members 20 can be detached together with the whole base body 12 from the adherent 30.

This configuration can also be applied to a case where the position of the adhesive member 10 needs to be rearranged in relation to the adherent 30 or a case where the plurality of wire-like transmission members 20 are detached from the adherent 30 when a product has a defect.

According to the fixing structure 1 of the wiring member having the above configuration, the base body 12 can be selectively heated by high-frequency induction heating. At this time, the first and second hot-melt adhesive agents 16 and 18 are heated by heat transmitted from the base body 12. Thus, an amount of heat for bonding can be suppressed even when the first hot-melt adhesive agent 16 is heated in the state where the wire-like transmission member 20 has contact with the first hot-melt adhesive agent 16.

The wire-like core wire 24 is hardly heated by high-frequency induction heating compared with the planar base body 12. Thus, even when the wire-like transmission member 20 is the electrical wire 22, increase in an amount of heat to the insulating covering 26 due to a thermal conduction from the core wire 24 can be suppressed. Accordingly, the wire-like transmission member 20 is mainly heated by the thermal conduction from the first hot-melt adhesive agent 16, thus heating of the wire-like transmission member 20 more than the first, hot-melt adhesive agent 16 can be suppressed.

The first hot-melt adhesive agent 16 is bonded to the wire-like transmission member 20 more easily than the second hot-melt adhesive agent 18, thus the fixing strength between the adhesive member 10 and the wire-like transmission member 20 can be increased. At this time, the first hot-melt adhesive agent 16 and the insulating covering 26 of the wire-like transmission member 20 are formed of the same kind of resin, thus a compatible combination can be easily set between these members.

The second hot-melt adhesive agent 18 is bonded to the adherent 30 more easily than the first hot-melt adhesive agent 16, thus the fixing strength between the adhesive member 10 and the adherent 30 can be increased. At this time, the second hot-melt adhesive agent 18 and the adherent 30 are formed of the same kind of resin, thus a compatible combination can be easily set between these members.

When high-frequency induction heating is performed, the second hot-melt adhesive agent 18 and the adherent 30 are bonded to each other in the bonding state of being dissolved more easily than the bonding state of the first hot-melt adhesive agent 16 and the wire-like transmission member 20, thus the plurality of wire-like transmission members 20 can be collectively detached together with the whole base body 12 from the adherent 30 at a time of scrapping or repairing a vehicle, for example.

[Modification Example]

In the description of the embodiment, the portion of the adherent 30 to which the adhesive member 10 is bonded is made of resin, however, this configuration is not necessary. The portion of the adherent 30 to which the adhesive member 10 is bonded is also considered to be made of metal. Adoptable as the adherent 30 are various metal members mounted to an automobile such as each component of a metal vehicle body, various types of reinforcement for an instrument panel, a scuff plate, and a slide rail for a seat, for example.

A metal material constituting the portion of the adherent 30 to which the adhesive member 10 is bonded is not particularly limited, but can be appropriately-selected from a metal material used for a vehicle such as iron, aluminum, copper, and various types of alloy, for example.

When the portion of the adherent 30 to which the adhesive member 10 is bonded is made of metal and an area thereof (area viewed from a normal direction of the base body 12) is large, the adherent 30 may also directly generate heat when the high-frequency induction heating is performed, thus the bonding state of the second hot-melt adhesive agent 18 and the adherent 30 is dissolved more easily than the bonding state of the first hot-melt adhesive agent 16 and the wire-like transmission member 20. Even in a case where the wire-like transmission member 20 is the electrical wire 22, when the area of the portion of the adherent 30 to which the adhesive member 10 is bonded is larger than that of the electrical wire 22, an amount of the adherent 30 to be directly heated is larger than an amount of the core wire 24 of the electrical wire 22 to be heated, thus the bonding slate of the second hot-melt adhesive agent 18 and the adherent 30 is dissolved more easily than the bonding state of the first hot-melt adhesive agent 16 and the wire-like transmission member 20.

In this case, the portion of the adherent 30 to which the adhesive member 10 is bonded is preferably formed to be heated by induction heating more easily than the base body 12. Accordingly, an amount of heat transmitted from the adherent 30 to the second hot-melt adhesive agent increases, and the bonding stale of the second bot-melt adhesive agent 18 and the adherent 30 is dissolved more easily than the bonding state of the first hot-melt adhesive agent 16 and the wire-like transmission member 20. Considered as an example that the portion of the adherent 30 to which the adhesive member 10 is bonded is formed to be heated by induction heating more easily than the base body 12 is that a material constituting the portion of the adherent 30 to which the adhesive member 10 is bonded is a material having high magnetic permeability such as iron, and a material constituting the base body 12 is a material having lower magnetic permeability than iron, such as copper and aluminum, for example. Considered is that the portion of the adherent 30 to which the adhesive member 10 is bonded is formed of a material having conductivity to have an area larger than the base body 12. In this case, the induction heating is performed using the induction heating apparatus 80 having the proximity surface 85 having the area larger than the base body 12, thus an amount of heat of the adherent 30 can be increased.

In the above embodiment or the above modification example, when high-frequency induction heating is performed in the fixing structure 1 of the wiring member, the second hot-melt adhesive agent 18 and the adherent 30 may not be bonded to each other in the bonding state of being dissolved more easily than the bonding slate of the first hot-melt adhesive agent 16 and the wire-like transmission member 20.

In the above description, the adherent 30 is a member originally assembled to the portion where the wire-like transmission member 20 is disposed in a vehicle, however, this configuration is not necessary. It is also considered that the adherent 30 is a member other than a member originally assembled to the portion where the wire-like transmission member 20 is disposed in a vehicle. That is to say, the adherent 30 is also considered a member newly adopted for assembling or protecting the wire-like transmission member 20 in a vehicle, for example. The adherent 30 is considered a sheet material, for example. The sheet material is considered to be used as a member for keeping the plurality of wire-like transmission members 20 flat, used as a member for regulating a route of wire-like transmission member 20, and used as a member to which a fixing component for fixing the wire-like transmission member 20 to a vehicle is attached, for example. The adherent 30 is also considered a protection component of the wire-like transmission member 20 such as a protector, for example.

In the above description, the wire-like transmission member 20 and the adherent 30 are bonded to the adhesive member 10 by one bonding process at the same time, however, this configuration is not necessary. The wire-like transmission member 20 and the adherent 30 may be bonded to the adhesive member 10 at different limes m different bonding processes. In this case, a softening temperature of one of the first hot-melt adhesive agent 16 and the second hot-melt adhesive agent 18 bonded and fixed to the other side member first is preferably lower than that of the other one of them.

It is considered that, for example, the wire-like transmission member 20 and the adhesive member 10 are fixed to each other first, and then the adhesive member 10 and the adherent 30 are fixed to each other. In this case, an intermediate product made alter the wire-like transmission member 20 and the adhesive member 10 are fixed to each other and before the adherent 30 is fixed can be deemed as an adhesive member-attached wiring body. The induction heating is performed in a state where the adhesive member-attached wiring body follows the adherent 30 to be able, to constitute the fixing structure 1 of the wiring member.

It is considered that, for example, the adherent 30 and the adhesive member 10 are fixed to each other first, and then the adhesive member 10 and the wire-like transmission member 20 are fixed to each other. In this case, an intermediate product made after the adherent 30 and the adhesive member 10 are fixed to each other and before the wire-like transmission member 20 is fixed can be deemed as an adhesive member-attached adherent. The induction heating is performed in a state where the adhesive member-attached adherent follows the wire-like transmission member 20 to be able to constitute the fixing structure 1 of the wiring member.

In the above description, the induction heating is performed in the suite where both the wire like transmission member 20 and the adherent 30 have contact with the adhesive member 10, however, this configuration is not necessary. It is also applicable that induction healing is performed on the adhesive member 10 in state where the wire-like transmission member 20 or the adherent 30 or both of them are separated from the adhesive member 10, and the wire-like transmission member 20 or the adherent 30 or both of them have contact with the adhesive member 10 and are fixed thereto in a state where the first hot-melt adhesive agent 16 or the second hot-melt adhesive agent 18 or both of them are softened.

In the above description, the first hot-melt adhesive agent 16 is bonded to the wire-like transmission member 20 more easily than the second hot-melt adhesive agent 18, however, this configuration is not necessary. There may also be a case where the second hot-melt adhesive agent 18 is bonded to the wire-like transmission member 20 more easily than the first hot-melt adhesive agent 16 or a case where both of them are equally bonded to the wire-like transmission member 20 easily. Similarly, in the above description, the second hot-melt adhesive agent 18 is bonded to the adherent 30 more easily than the first hot-melt adhesive agent 16, however, this configuration is not necessary. There may also be a case where the first hot-melt adhesive agent 16 is bonded to the adherent 30 more easily than the second hot-melt adhesive agent 18 or a case where both of them are equally bonded to the adherent 30 easily.

In the above description, the first hot-melt adhesive agent 16 and the second hot-melt adhesive agent 18 are different types of hot-melt adhesive agent, however, this configuration is not necessary. There may also be a case where the first hot-melt adhesive agent 16 and the second hot-melt adhesive agent 18 are the same type of hot-melt adhesive agent.

In the above description, the portions of the w ire-like transmission member 20 and the adherent 30 to which the first hot-melt adhesive agent 16 and the second hot-melt adhesive agent 18 are bonded are termed of different materials, however, this configuration is not necessary. There may also be a case where the portions of the wire-like transmission member 20 and the adherent 30 to which the first hot-melt adhesive agent 16 and the second hot-melt adhesive agent 18 are bonded are formed of the same material. In this case, there may be a case where the first hot-melt adhesive agent 16 and the second hot-melt adhesive agent 18 are the same type of adhesive agent or may also be a ease where they are different types of adhesive agents.

Each configuration described in the embodiment and each modification example can be appropriately combined as long as they are not contradictory.

EXPLANATION OF REFERENCE SIGNS

1 fixing structure of wiring member
10 adhesive member
12 base body 13 one main surface
14 other main surface
16 first hot-melt adhesive agent
18 second hot-melt adhesive agent
20 wire-like transmission member
22 electrical wire
24 core wire
26 insulating covering
30 adherent

The invention claimed is:

1. A fixing structure of a wiring member, comprising:
an adhesive member including a planar base body having conductivity, a first hot-melt adhesive agent provided on one main surface of the base body, and a second hot-melt adhesive agent provided on another main surface of the base body;
at least one wire-like transmission member bonded to the first hot-melt adhesive agent in the adhesive member on a side of the one main surface of the base body; and
an adherent bonded to the second hot-melt adhesive agent in the adhesive member on a side of the another main surface of the base body, wherein
the plurality of wire-like transmission members are bonded to the first hot-melt adhesive agent, and
when high-frequency induction heating is performed, the second hot-melt adhesive agent and the adherent are bonded to each other in a bonding state of being dissolved more easily than a bonding state of the first hot-melt adhesive agent and the wire-like transmission member.

2. The fixing structure of the wiring member according to claim 1, wherein
the wire-like transmission member is an electrical wire including a wire-like core wire made of metal and an insulating covering for covering the core wire.

3. A fixing structure of the wiring member, comprising:
an adhesive member including a planar base body having conductivity, a first hot-melt adhesive agent provided on one main surface of the base body, and a second hot-melt adhesive agent provided on another main surface of the base body;
at least one wire-like transmission member bonded to the first hot-melt adhesive agent in the adhesive member on a side of the one main surface of the base body; and
an adherent bonded to the second hot-melt adhesive agent in the adhesive member on a side of the another main surface of the base body,
the first hot-melt adhesive agent is bonded to the wire-like transmission member more easily than the second hot-melt adhesive agent, wherein
the first hot-melt adhesive agent and a covering of the wire-like transmission member are formed of the same kind of resin,
the covering of the wire-like transmission member and the adherent are formed of different materials, and
the first hot-melt adhesive agent and the second hot-melt adhesive agent are different types of hot-melt adhesive agent.

4. A fixing structure of the wiring member, comprising:
an adhesive member including a planar base body having conductivity, a first hot-melt adhesive agent provided on one main surface of the base body, and a second hot-melt adhesive agent provided on another main surface of the base body;
at least one wire-like transmission member bonded to the first hot-melt adhesive agent in the adhesive member on a side of the one main surface of the base body; and
an adherent bonded to the second hot-melt adhesive agent in the adhesive member on a side of the another main surface of the base body, wherein
the second hot-melt adhesive agent is bonded to the adherent more easily than the first hot-melt adhesive agent,
the second hot-melt adhesive agent and the adherent are formed of the same kind of resin,
a covering of the wire-like transmission member and the adherent are formed of different materials, and
the first hot-melt adhesive agent and the second hot-melt adhesive agent are different types of hot-melt adhesive agent.

* * * * *